(12) United States Patent
Saito

(10) Patent No.: US 6,178,587 B1
(45) Date of Patent: Jan. 30, 2001

(54) ROTARY WINDOW CLEANER

(75) Inventor: Shosaku Saito, Shizuoka (JP)

(73) Assignee: Saito Motor Co., Ltd., Shizouka (JP)

( * ) Notice: Under 35 U.S.C. 154(b), the term of this patent shall be extended for 0 days.

(21) Appl. No.: 09/328,533

(22) Filed: Jun. 9, 1999

(51) Int. Cl.$^7$ .................................. B60S 1/44; B60S 1/16
(52) U.S. Cl. ...................................... 15/250.22; 15/250.14; 464/160; 192/69.82
(58) Field of Search ........................... 15/250.22, 250.14, 15/250.27, 250.16, 250.17, 250.28, 250.3, 250.31; 464/160, 161; 192/69.82

(56) References Cited

U.S. PATENT DOCUMENTS

| | | | | |
|---|---|---|---|---|
| 2,329,895 | * | 9/1943 | Hansen ............................... | 15/250.14 |
| 3,649,990 | * | 3/1972 | Saito .................................. | 15/250.22 |
| 4,701,972 | * | 10/1987 | Saito .................................. | 15/250.22 |
| 4,773,117 | * | 9/1988 | Saito .................................. | 15/250.22 |
| 5,210,900 | | 5/1993 | Saito . | |

FOREIGN PATENT DOCUMENTS

1070038  *  5/1967  (GB) ................................ 15/250.27

* cited by examiner

Primary Examiner—Gary K. Graham
(74) Attorney, Agent, or Firm—Rodman & Rodman

(57) ABSTRACT

A rotary window cleaner comprises a first wiper (2) and a second wiper (3) connected respectively to a rotating shaft (22) of a first motor (20) and a rotating shaft (25) of a second motor (21) which are arranged adjacently in series to each other, and said first wiper (2) and said second wiper (3) are rotatably disposed proximate with respect to each other on a window pane (1). The rotating shaft (22) of the first motor (20) is provided at one end with a movable gear (23) and the rotating shaft (25) of the second motor (21) has a fixed gear (28) mounted at one end opposite to the movable gear (23). Said movable gear (23) is movably supported on one end of an operating lever (35), and a solenoid coil (36) is connected to the other end of said operating lever to couple and decouple the rotating shaft (22) of the first motor (20) and the rotating shaft (22) of the second motor (21) by engaging the movable gear (23) to the fixed gear (28) and disengaging the movable gear (23) from the fixed gear (28) sychronistically with the operation of every kind of said wipers.

3 Claims, 6 Drawing Sheets

ROTARY WINDOW CLEANER

BACKGROUND OF THE INVENTION

1. Field of the Invention

The present invention relates to a rotary window cleaner for a vehicle and a rolling stock of other kinds, rail car, a vessel, an airplane and the like.

2. Description of Prior Art

The conventional rotary window cleaner of this kind is shown in the U.S. Pat. No. 5,210,900, and comprises two wipers disposed proximate with respect to each other on the front window pane, driving motors separately provided respectively for said two wipers, and a limit switch for actuating other of two driving motors after one of two driving motors is actuated, in order to rotate the two wipers to the opposite direction with a lag angle formed between two wipers for wiping out the rain drops dropped on the front window pane. This publicly-known rotary window cleaner is provided, in order to avoid the possible interference between the two wipers which would be caused by elimination of the lag angle there-between when the two motors are reached to certain rotational speed, with a coupling mechanism to connect the rotating shafts of said two driving motors to each other which comprises a screw portion formed at the end of the rotating shaft of one motor, a drum portion having a groove formed at the opposite end of the rotating shaft of other motor, and a planetary element slidable along the groove formed on said drum portion and threadedly engagable with the screw portion. Thus, the two wipers are rotated in a condition holding the lag angle there-between by actuating two motors with a common driving source after a certain period of time of the other driving motor actuated.

The conventional rotary window cleaner as described above has such disadvantages that the planetary element for coupling and decoupling the rotating shafts of the driving motors cannot be easily released from the coupling and decoupling positions of the two rotating shafts because the planetary element is screwed strongly into the opposite ends of the screw portion of the rotating shaft, thereby not making coupling and decoupling said two rotating shafts more accurately, and that on the other hand, the planetary element would be easily be damaged by the groove of the drum portion provided on the rotating shaft of the other driving motor.

SUMMARY OF THE INVENTION

It is, therefore, an object of the present invention to provide a rotary window cleaner which conducts an accurate coupling and decoupling action for the rotating shafts of the two driving motors by means of a solenoid coil which is actuated synchronistically with the rotational speed of the two wipers so that the two wipers can be rotated with a lag angle.

A rotary window cleaner according to the present invention comprises a first wiper and a second wiper connected respectively to a rotating shaft of a first motor and a rotating shaft of a second motor disposed proximate with respect to each other coaxially. Said first and second wipers are disposed rotatably on the front window pane proximate with respect to each other. The first motor is provided at one and of the rotating shaft thereof with a movable gear and the second motor is provided at one end of the rotating shaft thereof with a fixed gear opposed to the moving gear. The movable gear is connected movably to the one end of an operating lever and the operating lever is connected at the other end to a solenoid coil for coupling and decoupling the rotating shaft of the first motor and the rotating shaft of the second motor.

In the modification of the rotary window cleaner according to the present invention, the solenoid coil is connected through a handle lever switch to an electronic control circuit having a power source and the operating lever is actuated by the solenoid coil so that the rotating shaft of the first motor is disconnected from the rotating shaft of the second motor in an intermittent operation of the wipers, and that the rotating shaft of the first motor is connected to the rotating shaft of the second motor in a secondary speed operation and a high speed operation of the wipers.

DETAILED DESCRIPTION OF THE PREFERRED EMBODIMENT

Figure 1:
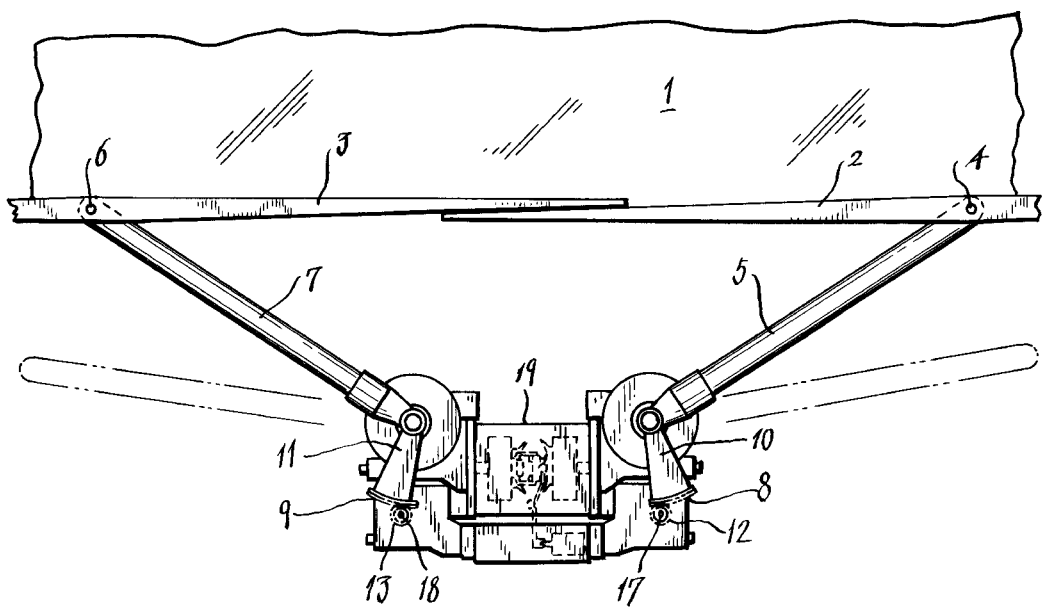
FIG. 1 is a front view of a rotary window cleaner according to the present invention.
Figure 2:
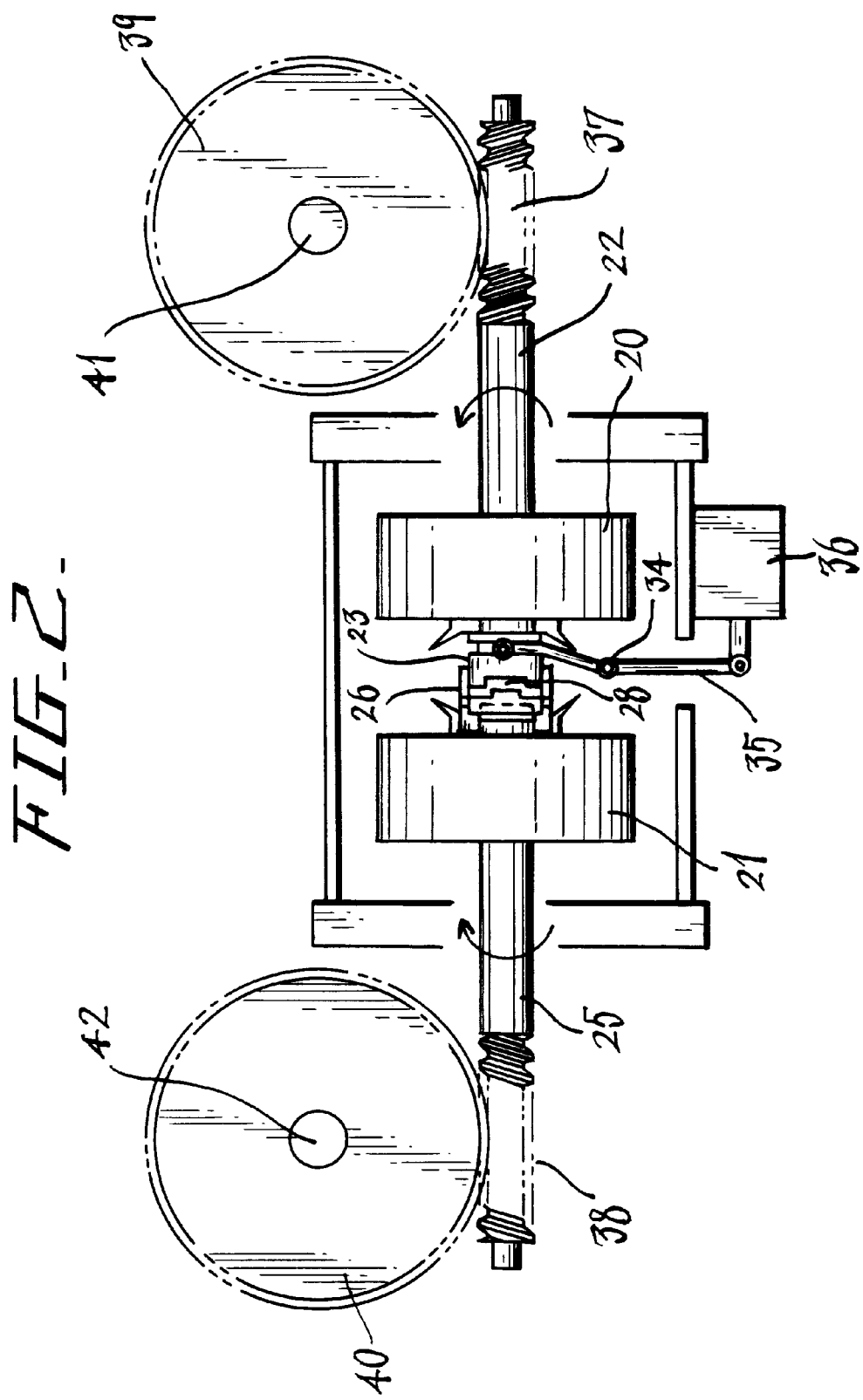
FIG. 2 is a front view showing rotating shafts of two motors and a coupling mechanism of two motors for the rotary window cleaner according to the present invention.
Figure 3:
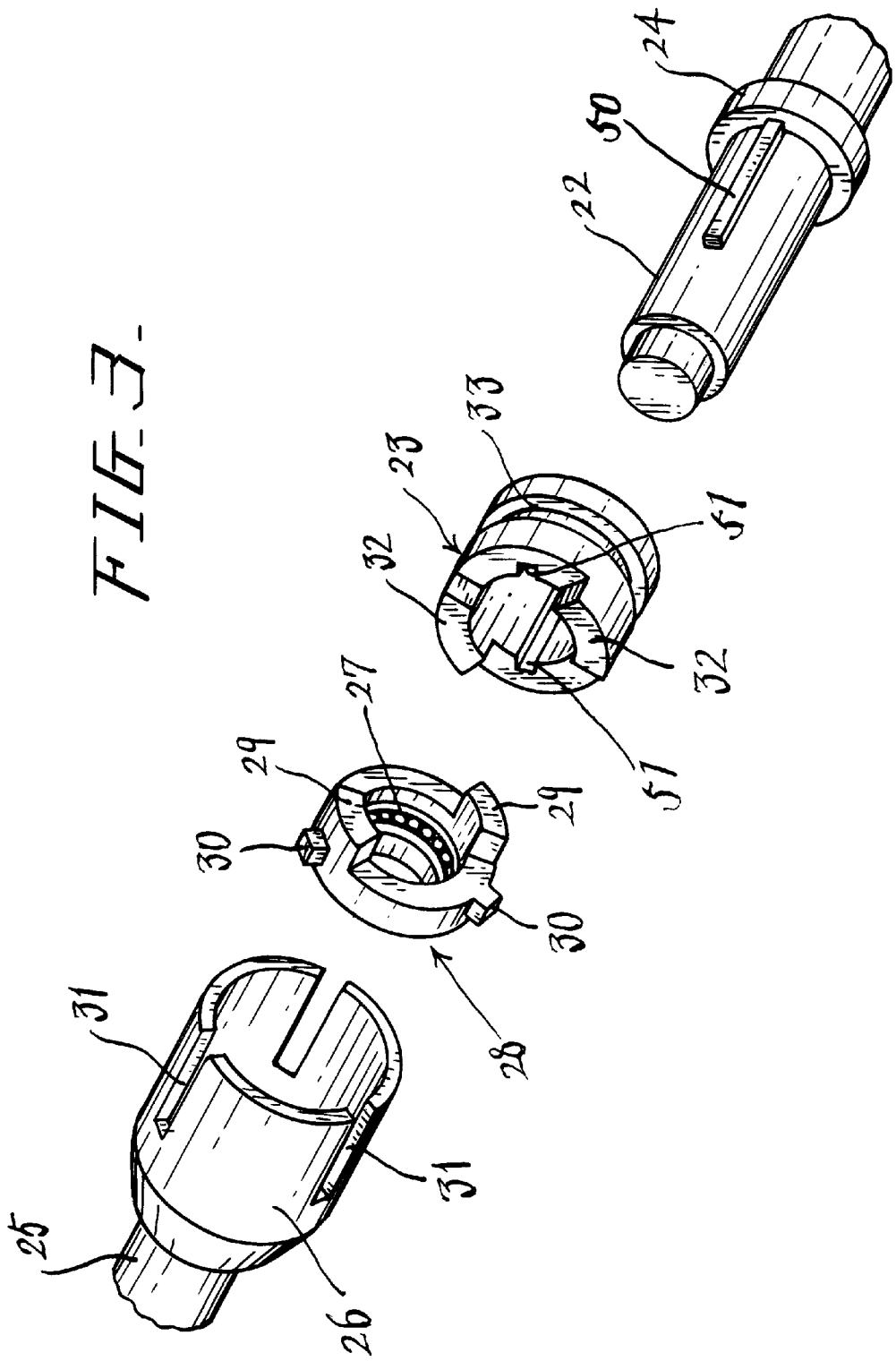
FIG. 3 is an exploded perspective view of the coupling mechanism shown in FIG. 2.
Figure 4:
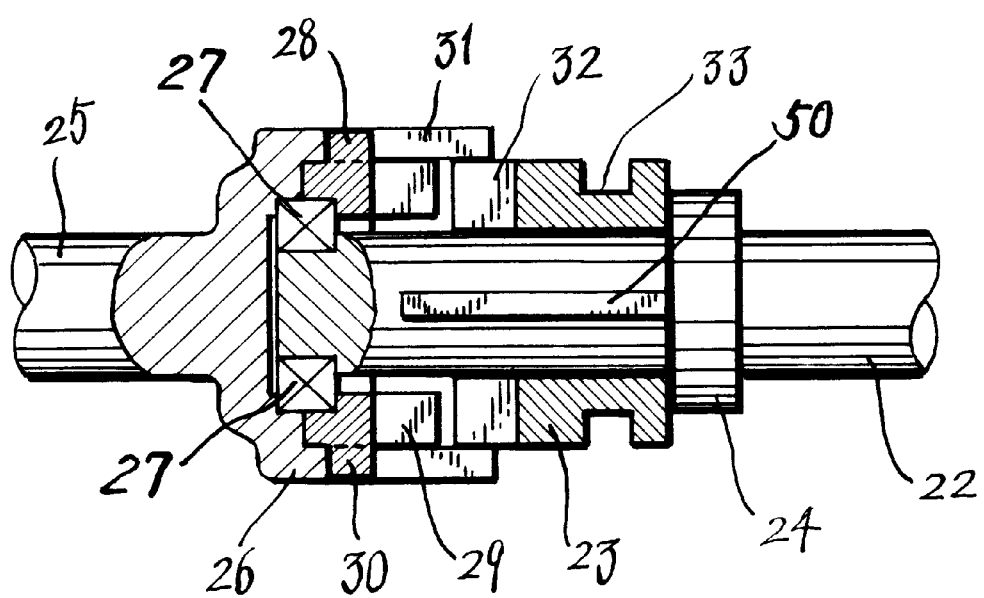
FIG. 4 is a sectional view of the coupling mechanism shown in FIG. 2.

In FIG. 1, the reference number 1 denotes a front window pane of automobile, on which a first wiper 2 and second wiper 3 are disposed proximate with respect to each other. The first wiper 2 is supported rotatably by a rotating shaft 4 to a supporting cylinder 5 and the second wiper 3 is similarly supported rotatably by a rotating shaft 6 to a supporting cylinder 7. The supporting cylinders 5, 7 is connected respectively to respective lever-shaped operating member 10, 11 which is provided at the lower end with respective gear 8, 9 engaged with respective pinion 12, 13. Said pinion 12, 13 is mounted on respective rotating shaft 17, 18 of worm wheel 15, which is engaged respectively with a rotating shaft of an elevating motor 14. The elevating motor 14 rotates said pinion 12, 13 so that the supporting cylinder 5, 7 can be elevated between the operating position of wiper 2, 3 on the front window pane 1 shown in a continuous line of FIG. 1 and a non-operating position of wiper 2, 3 in the bonnet shown in a chain dashed line.

The supporting cylinder 5, 7 is provided on a motor case 19, in which a first motor 20 for rotating the first wiper 2 and a second motor 21 for rotating the second wiper 3 are received. The first motor 20 and the second motor 21 is disposed proximate with respect to each other in parallel. The first motor 20 is provided at one end of a rotating shaft 22 thereof with a projected key 50 connected to a bush 24, and a key groove 51 in engagement with said key 50 is formed in a movable gear 23. The movable gear 23 is fitted on said rotating shaft 22 by engaging the key 50 with the key groove 51 and is supported on the bush 24 mounted on the rotating shaft 22 in such manner that said movable gear 23 can rotate together with the rotating shaft 22 of the first motor 21 and can move along the rotating shaft 22 toward a rotating shaft 25 of the second motor 21. The second motor 21 is provided at one end of the rotating shaft 25 thereof with a shaft drum 26, within which a bearing 27 and a fixed gear 28 are mounted, and the rotating shaft 22 of the first motor 21 is inserted through the fixed gear 28 and the bearing 27 into the shaft drum 26 and is supported rotatably by the bearing 27 within the shaft drum 26.

The fixed gear 28 is provided with an engaging tooth 29 projected at the end opposite to the moving gear 23 and with a fixed projection 30 projected in the side portion thereof. Said fixed projection 30 is press-fitted into the end portion of a fixed groove 31 formed on the shaft drum 26 to secure the fixed gear 28 to the shaft drum 26.

Said movable gear 23 is provided with an engaging tooth 32 at the end opposite to the fixed gear 28 and at a side portion thereof with an engaging groove 33, to which one end of an operating lever 35 is connected. The operating lever 35 is mounted pivotably about a pivot pin 34 within a motor case 19 and has the other end connected to a solenoid coil 36. Thus, the operating lever 35 can be pivoted by actuating the solenoid coil 36 in either direction of the clockwise direction or the counter-clockwise direction about an axis of the pivot pin 34. When the operating lever 35 is pivoted to the counter-clockwise direction, said movable gear 23 is moved along the rotating shaft 22, thereby enabling the engaging tooth 32 to engage to the engaging tooth 29 of the fixed gear 28 in order that the rotating shaft 22 of the first motor can be connected to the rotating shaft 25 of the second motor 21. When the operating lever 35 is pivoted to the clockwise direction, the movable gear 23 is moved along the rotating shaft 22 so as to detach apart from the fixed gear 28 and thereby is supported on the bush 24 in order to release the engagement of the engaging tooth 32 and the engaging tooth 29 so that the rotating shaft 22 can be disconnected from the rotating shaft 25.

Figure 5:
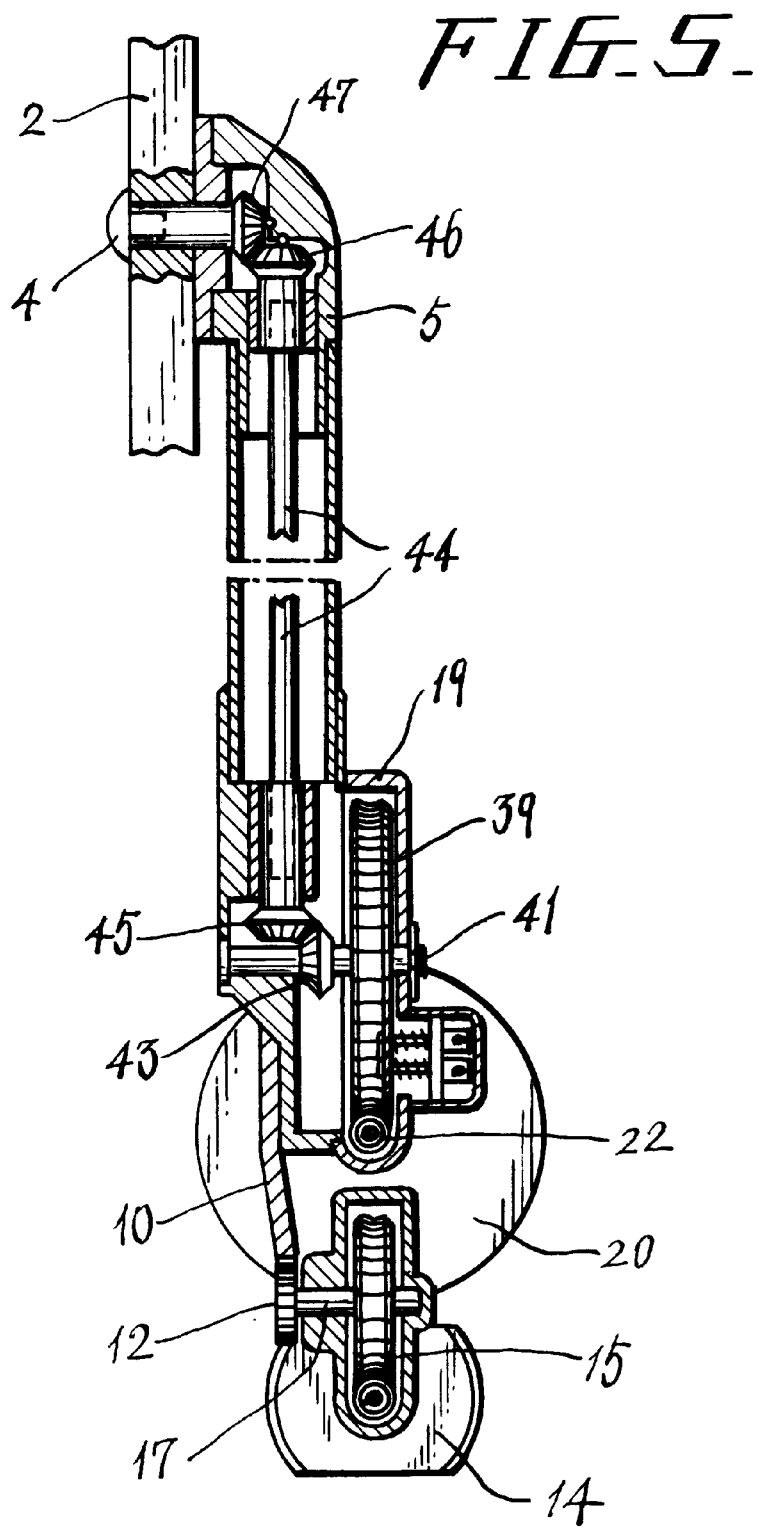
FIG. 5 is a vertical sectional side view of a first wiper of the rotary window cleaner according to the present invention.

A screw portion 37 is provided on the rotating shaft 22 of the first motor, while another screw portion 38 is also provided on the rotating shaft 25 of the second motor 21. Said screw portion 37 is engaged with a worm wheel 39 having a rotating shaft 41 and at the same time the screw portion 38 is engaged with a worm wheel 40 having the rotating shaft 42. Said worm wheel 39, 40 is provided as shown in FIG. 5 with a bevel gear 43, 43 mounted at one end of the rotating shaft 41, 42 and said bevel gear 43, 43 is engaged with a bevel gear 45, 45 mounted on one end of a connecting shaft 44, 44 supported rotatably within the supporting cylinder 5, 7. A bevel gear 46, 46 mounted to the other end of the connecting shaft 44 is engaged with a bevel gear 47, 47 mounted on the rotating shaft 4, 6 of the first wiper 2 and the second wiper 3. Thus, the rotation of the first motor 20 and the second motor 21 is transmitted respectively via the rotating shaft 22, 25 to the worm wheel 39, 40, from which the rotation is transmitted via the bevel gear 43, 45 to the connecting shaft 44, from which the rotation is transmitted to the rotating shaft 4, 6 so that the first wiper 2 and the second wiper 3 can be rotated to the opposite direction by the first motor 20 and the second motor 21 respectively.

Figure 6:
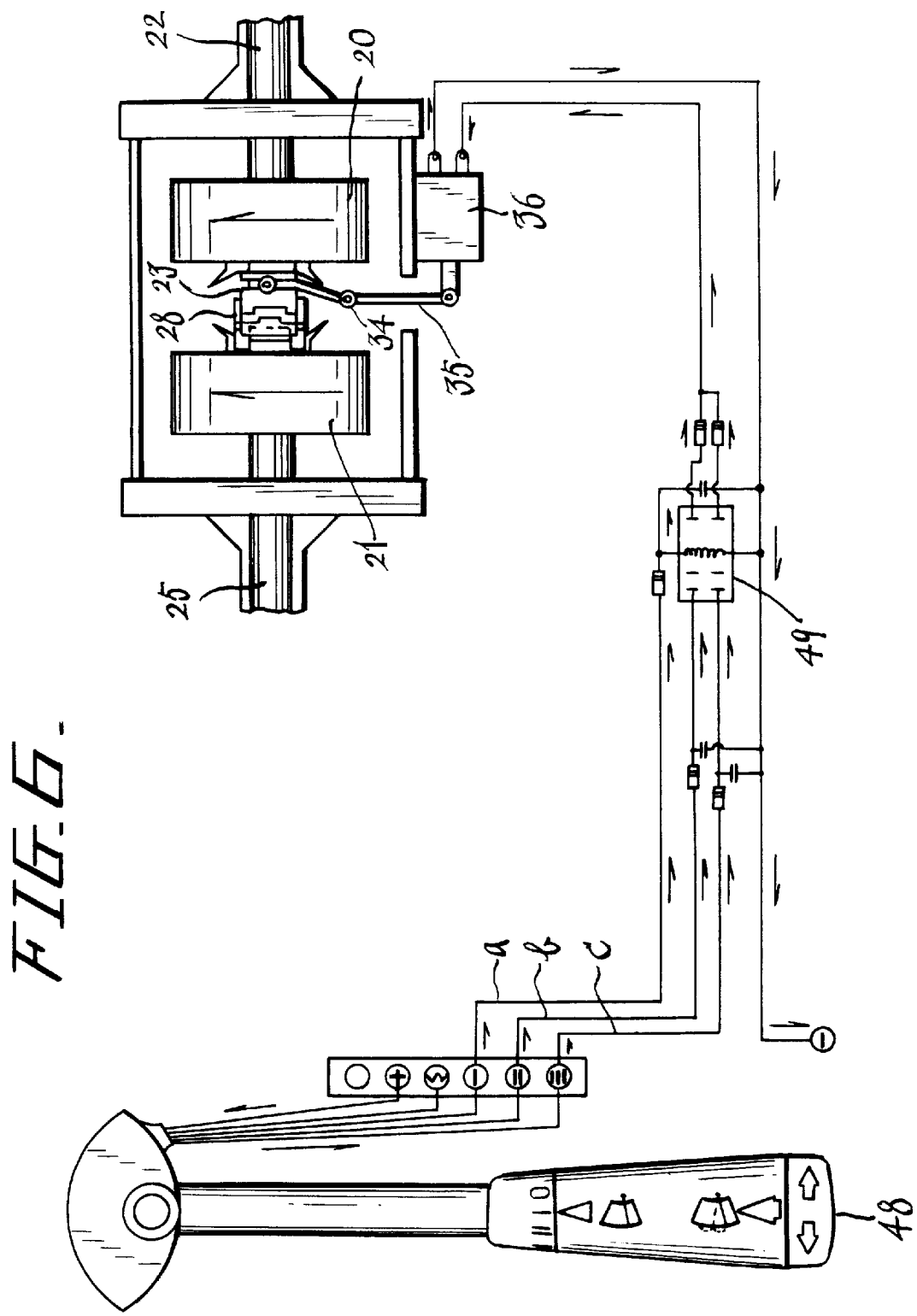
FIG. 6 is an electronic control circuit showing the relationship between a solenoid coil and handle lever switch.

FIG. 6 shows a wiring circuit diagram for the solenoid coil 36 and a handle lever switch 48. When an electronic current is sent to the solenoid coil 36 at the time of a secondary speed operation and a high speed operation of the wipers where there is no rotation lag between the two motors after an intermittent rotating operation of the first wiper 2 and the second wiper 3, the operating lever 35 is actuated to connect the rotating shaft 22 of the first motor 20 to the rotating shaft 25 of the second motor 21, and the first wiper 2 and the second wiper 3 are rotated with the lag angle in the common actuating source.

When the rotary window cleaner according to this invention is started by operating the handle lever switch 48, the elevating motor 14 is actuated to elevate the two wipers 2, 3 to an operating position from a non-operating position, and then the first motor 20 is actuated and the second motor 21 is actuated after a predetermined time of the actuation of the first motor 20, whereby the intermittent rotating operation of the first wiper 2 and the second wiper 3 is conducted at the low speed at a predetermined time interval. In this time, the first wiper 2 is rotated by the first motor 20 and the second wiper 3 is rotated by the second motor 21 intermittently at the low speed without any mutual interference, as an electronic current is flowed to a conductor (a) and is not applied to the solenoid coil 36. Then, when the hand lever switch 48 is switched over to the secondary speed operation where there is no rotation lag between the first motor 20 and the second motor 21, the current of the conductor (a) of the intermittent operation is cut off and the current is flowed to a conductor (b) of the secondary speed operation to switch on the solenoid coil 36 through a relay coil 49, whereby the solenoid coil 36 attracts one end of the operating laver 35 and pivots the operating lever 35 about the pivot pin 34, to move the movable gear 23 along the rotating shaft 22 and to engage the movable gear 23 to the fixed gear 28. Thus the rotating shaft 22 of the first motor 20 is connected with the rotating shaft 25 of the second motor 21, and the first wiper 2 and the second wiper 3 are rotated by one common actuating source at the secondary speed to the opposite direction in such condition that the rotation lag i.e. the lag angle of the two wipers is held. Further, upon switching the handle lever switch 48 over to a high speed operation of the wipers, the circuit is switched over to a conductor (c) and the current is flowed to the solenoid coil 36 through the relay coil 49 as in the case with the conductor (b) for the secondary speed operation of the wipers, whereby the rotating shaft 22 of the first motor 20 is connected to the rotating shaft 25 of the second motor 21, and the first wiper 2 and the second wiper 3 are rotated by one common actuating source at a high speed to the opposite direction in such condition that the lag angle is held between two wipers. Thus, the solenoid coil 36 is provided to actuate the operating lever 35 in synchronization with the operations of every kind of the wipers 2, 3.

An operation for making the rotary window cleaner stop will be described. Upon switching over the handle lever switch 48 from the high speed operation to the secondary speed operation of the wipers, the circuit is switched over from the conductor (c) to the conductor (b), and the first wiper 2 and the second wiper 3 are rotated by one common actuating source at the secondary speed in such conditions that the rotating shaft 22 and the rotating shaft 25 is coupled and the lag angle is held between two wipers. Then, upon switching over the handle lever switch 48 from the secondary speed operation to the intermittent operation of the wiper, the circuit is switched over from the conductor (b) to the conductor (a) to cause the current not to pass to the solenoid coil 36, thereby said solenoid coil 36 presses one end of the operating lever 35 and pivots the operating lever 35 to the clockwise direction about the pivot pin 34 to release the movable gear 23 from the fixed gear 28 and to slide along the rotating shaft 22 to support it on the bush 24, and thus the rotating shaft 22 of the first motor 20 is disconnected from the rotating shaft 25 of the second motor 21 and the first wiper 2 is rotated by the first motor 20 and the second wiper 3 is rotated by the second motor 21 independently and intermittently at the low speed in the condition holding a lag angle between two wipers. Finally, by switching over the handle lever switch 48 from the intermittent operation to a stop position of the wipers, the circuit of solenoid coil 36 is also switched over from the conductor (a) to a stop position, and the first motor and the second motor 21 are stopped together for their rotation, and thus the first wiper 2 and the second wiper 3 is stopped horizontally at the initial operating position. Then the elevation motor 14 is actuated to descent the two wipers 2, 3 to the non-operating position within the bonnet from the initial operating position.

The present invention makes it possible to conduct reliable and accurately connecting and disconnecting of the rotating shafts of two motors by means of a solenoid coil which is electronically actuated synchronistically with the operations of every kind of the wipers, and also makes it possible to rotate always two wipers disposed proximate with respect to each other without any interference to each other in such condition that a lag rotation, i.e. a lag angle is held between two wipers.

What is claimed is:

1. A rotary window cleaner comprising:

a rotating shaft of a first motor;

a rotating shaft of a second motor disposed coaxially proximate the rotary shaft of said first motor;

a first wiper connected to the rotating shaft of the first motor and disposed rotatably on a front window pane;

a second wiper connected to the rotating shaft of the second motor and disposed rotatably proximate the first wiper on the front window pane;

a movable gear disposed movably on one end of the rotating shaft of the first motor;

a fixed gear mounted to one end of the rotating shaft of the second motor opposite to said movable gear;

an operating lever for supporting movably said movable gear; and a solenoid coil mounted to said operating lever for operating said operating lever synchronistically with the operation of each kind of said wipers so as to connect and disconnect between the rotating shaft of the first motor and the rotating shaft of the second motor by engaging the movable gear to the fixed gear and disengaging the movable gear from the fixed gear.

2. A rotary window cleaner according to claim 1; wherein said movable gear is provided with an engaging tooth and is fitted movably on one end of the rotating shaft of the first motor; the fixed gear is mounted to a shaft drum formed at one end of the rotating shaft of the second motor and is provided with an engaging tooth opposite to the engaging tooth of the movable gear; the one end of the rotating shaft of the first motor is extended into the shaft drum of the rotating shaft of the second motor through said fixed gear; the movable gear is rotatably supported to one end of the operating lever which is pivoted about a pivot shaft; and the solenoid coil is mounted to the other end of the operating lever for pivoting the operating lever so as to connect and disconnect between the rotating shaft of the first motor and the rotating shaft of the second motor by engaging the engaging tooth of the movable gear with the engaging tooth of the fixed gear and disengaging the engaging tooth of the movable gear from the engaging tooth of the fixed gear.

3. A rotary window cleaner according to claim 1 wherein the solenoid coil is connected to an electronic control circuit through a handle lever switch for actuating the operating lever so as to disconnect between the rotating shaft of the first motor and the rotating shaft of the second motor in an intermittent rotary operation of said wipers and so as to connect between the rotating shaft of the first motor and the rotating shaft of the second motor in a secondary speed rotary operation and high speed rotary operation of said wipers.

* * * * *